May 22, 1951 V. G. RISTVEDT 2,554,385
SEPARABLE VEHICLE WHEEL
Filed March 16, 1948

INVENTOR.
Victor G. Ristvedt
BY
David Manley Heller
Attorney

Patented May 22, 1951

2,554,385

UNITED STATES PATENT OFFICE 2,554,385

SEPARABLE VEHICLE WHEEL

Victor G. Ristvedt, Albany, Ga.

Application March 16, 1948, Serial No. 15,237

2 Claims. (Cl. 301—6)

My invention relates to separable vehicle wheels to facilitate tire changing.

An object of my invention is to provide a separable vehicle wheel formed of two mating steel discs, one of which is attachable in the usual manner to the brake drum or hub of a vehicle; the other mating steel disc being attached by means of bolts and nuts thereto so that, in order to remove the tire from a vehicle wheel, it would only be necessary to remove the detachable outside disc.

A further object of my invention is to provide a frictional attaching means for holding the hub cap to the detachable tire holding disc.

A further object of my invention is to provide a separable vehicle wheel that may be economically produced in large quantities.

Other objects and advantages embraced in my invention will be disclosed in the following description and the accompanying illustrations, in which like parts are designated by like numerals, and in which Fig. 1 is a side view of my vehicle wheel with a tire mounted thereon.

Figure 1:
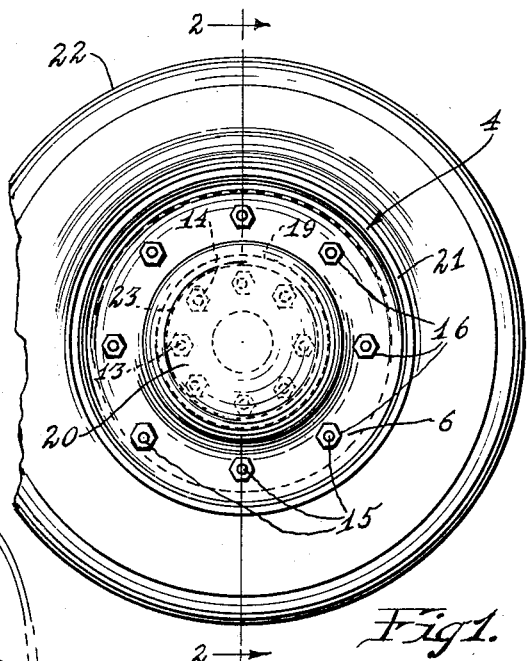

Referring to the illustrations, my invention is generally designated 4, and consists of a wheel attaching disc 5 and a mating tire holding disc 6, preferably made of steel. The wheel attaching disc 5 has a central opening 7, the circumference of which is defined by a brake drum attaching flange 8. Attaching flange 8 is formed into a cylindrically-shaped locating sleeve 9, which fits over the brake drum or hub 23 of the said vehicle.

Wheel attaching disc 5 is dished inwardly at 10 to form a tire retaining flange 11 on its outer circumference. In spaced circular arrangement about the circumference of brake drum attaching flange 8 are a number of attaching holes 12, which by means of stud bolts 13, fixed in brake drum 23 and lock nuts 14, serve to hold the wheel attaching disc 5 in place on the said vehicle brake drum 23. A number of stud bolts 15 are fixed in spaced circular arrangement in the dished portion 10 of wheel attaching disc 5.

Figure 2:
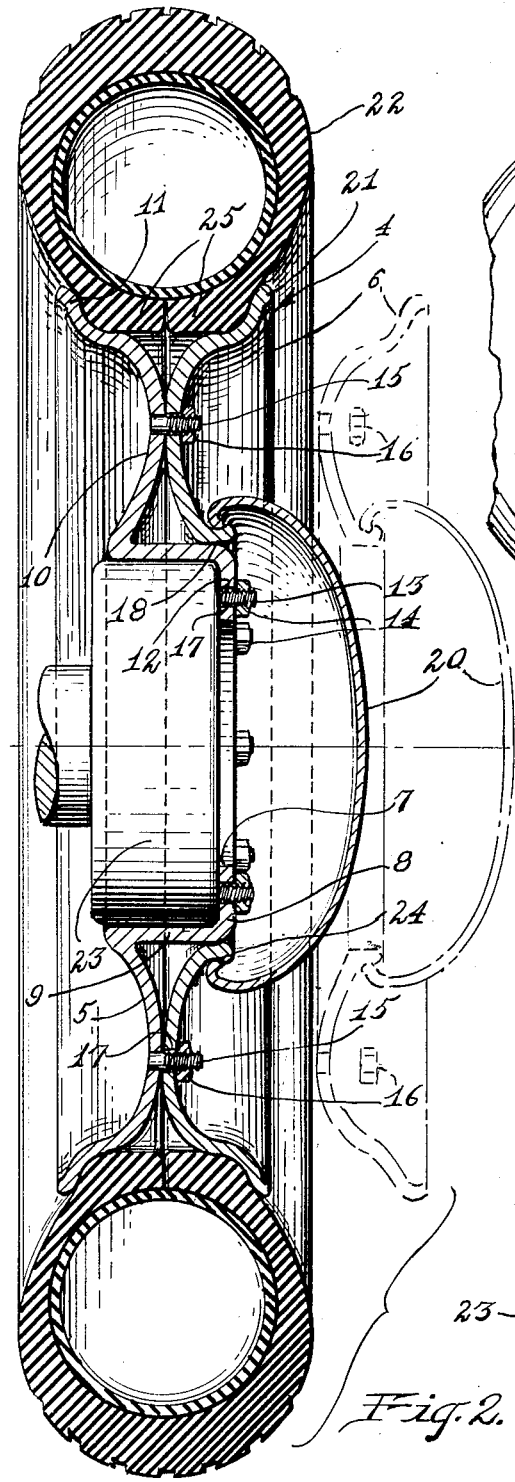
Fig. 2 is an enlarged cross-sectional view of my invention taken substantially on line 2—2 on Fig. 1.

A tire holding disc 6, preferably made of steel, has a central opening 18 which fits over sleeve 9, and is detachably secured to wheel attaching disc 5 by means of the said stud bolts 15, together with lock nuts 16 by means of attaching holes 17, in the said tire holding disc 6. The circumference or rim of central opening 18 is formed outwardly into a hub cap holding flange 19. The hub cap holding flange 19 is slightly beaded at 24 to hold, in frictional engagement, a hub cap 20, as shown in Fig. 2. The outer circumference of tire holding disc 6 is formed into a tire retaining flange 21, similar but oppositely positioned to flange 11 of wheel attaching disc 5. The said tire holding flanges 11 and 21 are so formed as to permit the retaining therebetween of the lips 25 of a tire casing 22. The wheel attaching disc 5 and the tire holding disc 6 have inwardly dished annular portions of identical configuration.

Figure 3:
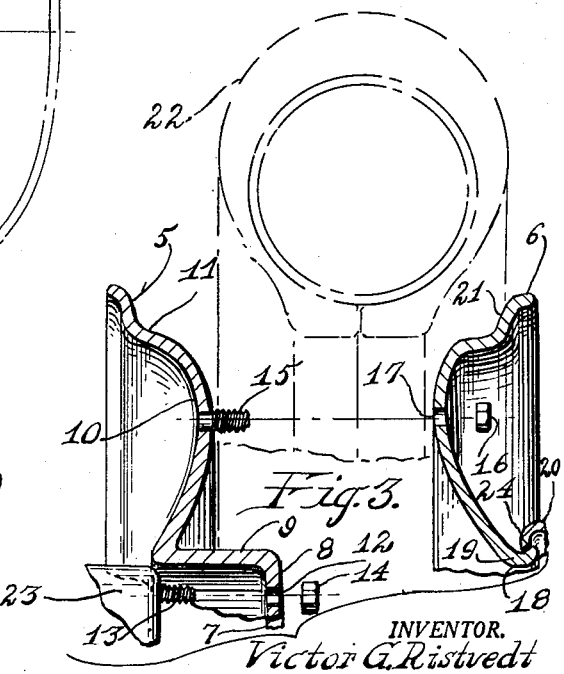
Fig. 3 is a cross-sectional view of a portion of my invention showing its component parts in an exploded arrangement.

The tire 22 may be removed from my separable vehicle wheel 4 merely by removing lock nuts 16, which will allow tire holding disc 6 to be separated from wheel holding disc 5, and permit the removal of tire 22 therefrom. When the said tire has been repaired or replaced, it is again positioned upon flange 11, as shown in Fig. 2, and held thereby the replacing of tire holding disc 6, locked securely in place by lock nuts 16. The entire vehicle wheel may be removed, if desired, in the conventional way by prying off hub cap 20 and removing lock nuts 14 from stud bolts 13, as shown in Fig. 3.

My separable vehicle wheel should prove valuable to autoists and mechanics alike, in that it eliminates the necessity of prying the tire casing from the vehicle wheel by tire irons with the consequent danger of damage to the said casing.

Although my invention has been described, the terms used are to be deemed terms of description rather than terms of limitation, my intention being to retain the right to all mechanical equivalents of the structural elements depicted, provided they fall within the purview of the appended claims.

Having thus disclosed and revealed my invention, what I claim as new, and desire to secure by Letters Patent, is:

1. In combination a separable vehicle wheel and a cylindrical brake drum, comprising a wheel attaching disc removably securable to the said cylindrical brake drum, a tire holding disc removably secured to the said wheel attaching disc, the said wheel attaching disc and the said tire holding disc having inwardly dished annular portions of identical configuration and positioned in intimate contact, fastening means removably securing the said discs at several points along their line of contact, the said wheel attaching disc being provided with a central locating sleeve having a cavity therein fitted over and encircling the entire peripheral portion of the said brake drum, the said locating sleeve having an attaching flange portion at its outer end defining a central opening, said attaching flange portion being positioned in abutting relationship with the outer end of the said brake drum, and fastening means securing the said attaching flange portion to the outer end of the said brake drum, the said tire holding disc being provided with a central opening to fit the peripheral portion of the said locating sleeve.

2. In combination a separable vehicle wheel and a cylindrical brake drum, comprising a wheel attaching disc removably securable to the said cylindrical brake drum, a tire holding disc removably secured to the said wheel attaching disc, the said wheel attaching disc and the said tire holding disc having inwardly dished annular portions of identical configuration and positioned in intimate contact, fastening means removably securing the said discs at several points along their line of contact, both of the said discs having outer flared flange portions compositely forming a seat for a tire and tube, the said wheel attaching disc being provided with a central locating sleeve having a cavity therein fitted over and encircling the entire peripheral portion of the said brake drum, the said locating sleeve having an attaching flange portion at its outer end defining a central opening, said attaching flange portion being positioned in abutting relationship with the outer end of the said brake drum, and fastening means securing the said attaching flange portion to the outer end of the said brake drum, the said tire holding disc being provided with a central opening to fit the peripheral portion of the said locating sleeve.

VICTOR G. RISTVEDT.

REFERENCES CITED

The following references are of record in the file of this patent:

UNITED STATES PATENTS

| Number | Name | Date |
|---|---|---|
| 1,179,768 | Simmons | Apr. 18, 1916 |
| 1,518,411 | Roe | Dec. 9, 1924 |
| 1,638,741 | McGinniess | Aug. 9, 1927 |
| 2,145,565 | Yankovitch | Jan. 31, 1939 |
| 2,176,914 | Massa | Oct. 24, 1939 |
| 2,384,649 | Sinclair | Sept. 11, 1945 |
| 2,391,200 | Sinclair | Dec. 18, 1945 |

FOREIGN PATENTS

| Number | Country | Date |
|---|---|---|
| 817,857 | France | Sept. 13, 1937 |